Patented Feb. 27, 1951

2,543,424

UNITED STATES PATENT OFFICE 2,543,424

CATALYTIC REACTION OF HYDROFURYL CARBINOLS WITH AMMONIA OR AMINES

Leo Jerome Spillane, Morristown, and Ralph Colton Tallman, Morris Township, Morris County, N. J., assignors to Allied Chemical & Dye Corporation, New York, N. Y., a corporation of New York No Drawing. Application March 7, 1946, Serial No. 652,792

6 Claims. (Cl. 260—290)

This invention relates to a new method for carrying out reactions in which a hydrofuryl carbinol such as tetrahydrofurfuryl alcohol or its alkyl derivatives are catalytically reacted with ammonia or a primary amine to substitute nitrogen for the oxygen in the furan ring and expand the ring structure to one containing 5 carbon atoms; i. e., to form compounds containing a heterocyclic ring with 5 carbon atoms and 1 nitrogen atom in the ring.

It is known that tetrahydrofurfuryl alcohol may be catalytically treated in the vapor phase at elevated temperatures to convert it into pyridine or piperidine. For example, by passing tetrahydrofurfuryl alcohol mixed with ammonia in contact with a catalyst composed of the oxides of aluminum and chromium heated to 600° C., pyridine is said to be formed. It is also known to pass tetrahydrofurfuryl alcohol together with ammonia at temperatures above 150° C. in contact with catalysts such as platinum or the oxides or sulfides of nickel, cobalt or copper. These reactions all involve substitution of the oxygen in the heterocyclic furan ring containing 4 carbon atoms and 1 oxygen atom by nitrogen and expansion of the ring structure to the pyridine ring containing 5 carbon atoms and 1 nitrogen atom. This substitution and ring expansion is accompanied by the elimination of water. Simultaneously there may be more or less dehydrogenation of the hydrogenated ring structure to form the pyridine ring containing alternate double bonds, i. e.,

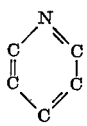

We have now discovered that catalysts containing molybdenum oxide or sulfide and a material characterized by being a catalyst for the dehydration of alcohols (such materials hereafter will be referred to as alcohol dehydration catalysts) are particularly active for promoting the reactions of hydrofuryl carbinols, such as dihydrofurfuryl alcohol or tetrahydrofurfuryl alcohol, and their alkyl derivatives with ammonia to substitute nitrogen for the oxygen in the ring structure and expand the ring to a heterocyclic 5 carbon-1 nitrogen ring. We have found such catalysts containing molybdenum oxide or sulfide to be particularly active for promoting these reactions and the production of compounds from which pyridine and substituted pyridines, such as the picolines, may be obtained by dehydrogenation either simultaneously with the foregoing reactions or in a separate step in which piperidines or their alkyl derivatives first formed from the furan derivatives are dehydrogenated.

Our invention, therefore, is directed to catalyzing the reaction of a hydrofuryl carbinol and ammonia or primary amine to substitute nitrogen for the oxygen in the ring structure and to expand the ring to a heterocyclic 5 carbon-1 nitrogen ring employing as catalyst a contact material containing an alcohol dehydration catalyst and molybdenum oxide or sulfide. The hydrofuryl carbinol is one in which the carbon atom of the furan ring which is combined with the carbinol radical is also combined with hydrogen. It may be an alkyl substituted dihydro- or tetrahydrofuryl carbinol. Thus, the hydrofuryl carbinols which undergo the desired reactions with ammonia or a primary amine are characterized by containing the structure

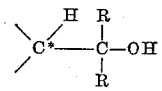

in which C* represents a carbon atom in the furan ring and R may be hydrogen or an alkyl radical. Further, instead of hydrogen, one or more alkyl radicals may be combined with the carbon atoms of the furan ring other than that represented by C*.

The catalysts used in carrying out our invention may contain the molybdenum oxide or sulfide mixed with or coated on the material active to catalyze the dehydration of an alcohol. Thus the latter material may serve both as a support for the molybdenum oxide or sulfide as well as imparting to the catalyst its characteristic catalytic properties. The catalysts used in carrying out this invention may be prepared by any and all of the procedures described in United States Patents 2,124,566 and 2,124,567, which issued July 26, 1938 to Aristid V. Grosse, for the preparation of catalysts containing aluminum oxide and molybdenum oxide. The catalysts may be prepared, for example, by mixing a solution of ammonium molybdate in a dilute aqueous ammonia (e. g. 15% NH₃ solution in water) with alumina and heating the mixture to remove the water. Granules of alumina thus coated or impregnated with ammonium molybdate may be dried at 110–140° C. for two hours or more before being charged into a reaction chamber in which the catalyst is to be used. The catalyst thus prepared containing molybdenum oxide and alumina is preferably heated in an atmosphere of hydrogen to reduce the molybdenum oxide to a lower oxide or to the metal before the catalyst is used for promoting the reaction of a hydrofuryl carbinol or its alkyl derivative with ammonia or a primary amine. This reduction treatment of the catalyst may be carried out, for example, at a temperature of 450°–500° C. Another suitable method of preparing the catalyst is by mixing desired proportions of dry molybdic acid and alumina and pelleting or tableting the mixture, preferably with a lubricant such as graphite and a binder such as starch present to facilitate the tableting of the dry materials. Tablets thus prepared may be heated in air at, for example, 450–500° C. to remove the graphite and starch and then reduced by heating in hydrogen before being employed as catalysts for the reaction of the hydrofuryl carbinol. Catalysts of molybdenum sulfide may be prepared by heating a molybdate or molybdenum oxide catalyst prepared in any of the above-described methods in an atmosphere of hydrogen sulfide. For example, the molybdate or molybdenum oxide catalyst may be heated at 450°–500° C. for about 16 hours while passing over the catalyst gaseous hydrogen sulfide, and the material may then be used to catalyze the reaction of the hydrofuryl carbinol with ammonia or a primary amine without further treatment.

In referring to a catalyst containing molybdenum oxide or molybdenum sulfide it is not intended that this be interpreted as a precise statement of the chemical form in which the molybdenum exists in the catalyst when it is catalyzing the reaction of the hydrofuryl carbinol with ammonia or a primary amine. It is intended to refer to a catalyst which at some stage of its production or during use contains either the free or combined (as in a molybdate) oxide or sulfide of molybdenum. Further, in specifying the amounts of molybdenum oxide or sulfide present in the catalyst it should be understood that this is in terms of the content of molybdenum calculated as $MoO_2$ or $MoS_2$, respectively, without intending to imply that the molybdenum is present in the form of this particular oxide or sulfide.

Numerous materials are well known for the dehydration of alcohols and may be employed with molybdenum oxide or sulfide in the catalysts for use in carrying out our invention. Among such dehydration catalysts we may mention the oxides of aluminum, thorium, tungsten, zinc, silver, copper, iron, titanium, tin, cerium, etc. alone or with other materials. While our invention is not limited thereto, the metal oxide alcohol dehydration catalysts, and particularly aluminum oxide, are the preferred dehydration components present in the catalysts containing molbdenum oxide or sulfide which are used in accordance with this invention for promoting the reactions of a hydrofuryl carbinol or its alkyl derivatives with ammonia or a primary amine. The aluminum oxide is preferably used in the form of an "activated alumina" such as may be obtained on the market or may be prepared specially by known processes involving dehydration of hydrates of aluminum oxide under controlled temperature conditions. Accordingly, our invention will be more particularly described in connection with catalysts containing activated alumina as the active dehydration constituent.

Activated alumina is itself a catalyst for the reaction, for example, of ammonia with tetrahydrofurfuryl alcohol to substitute nitrogen for the oxygen of the furan ring and expand the ring to the pyridine ring. Molybdenum oxide itself does not appear to have any substantial catalyst effect on this reaction. We have discovered, however, that catalysts containing both molybdenum oxide and activated alumina have a much higher activity for promoting this reaction than activated alumina itself. As the amount of molybdenum oxide mixed with the activated alumina is increased from zero upwardly, the activity of the catalyst for promoting the reaction first increases to a maximum and then decreases as the amount of molybdenum oxide in the mixture approaches 100%. Catalysts containing molybdenum sulfide and activated alumina show a similar activity for promoting the reaction of ammonia or a primary amine with a hydrofuryl carbinol or its alkyl derivatives as the molybdenum oxide catalysts.

The proportions of molybdenum oxide or sulfide and activated alumina representing catalysts of maximum activity vary, depending upon the methods used for preparing the catalyst, the particular hydrofuryl carbinol treated and conditions under which the catalysts are used for promoting the reaction of the hydrofuryl carbinol and ammonia or amine. The catalysts are preferably used for the treatment of tetrahydrofurfuryl alcohol or its alkyl derivatives and ammonia to form pyridines and piperidines at temperatures of about 340° to about 520°, although they are active at temperatures above and below this range. About 10 to 30 parts molybdenum oxide or sulfide on 100 parts (by weight) activated alumina gives high yields of pyridines from tetrahydrofurfuryl alcohol or its alkyl derivatives and ammonia at about 500° C. While it is preferred that the catalysts substantially consist of activated alumina and molybdenum oxide or sulfide, other materials may be present and the increased catalytic activity of the activated alumina caused by the presence of the molybdenum oxide or sulfide which characterizes the catalysts used in carrying out our invention may still be obtained.

The following examples are illustrative of the process of this invention:

*Example 1.*—Ammonium molybdate is dissolved in aqueous ammonia and the resulting solution is mixed with granules of commercial activated alumina of approximately 8–10 mesh size. The ammonium molybdate solution and alumina granules were mixed in proportions corresponding to about 10 parts by weight of $MoO_2$ to 100 parts by weight of the activated alumina. The mixture is dried at about 100° to 150° C. for about eight hours. The thus prepared catalyst particles are placed in a reaction chamber and reduced by heating in a current of hydrogen at about 450°–500° C. for several hours.

Vapors of tetrahydrofurfuryl alcohol mixed with ammonia in the proportions of about 92 volumes of tetrahydrofurfuryl alcohol vapors and 315 volumes of ammonia (calculated to STP) are then contacted with the catalyst heated at about 503° C. The vapors may be passed in contact with the catalyst at a space velocity of about 407. (The space velocities referred to herein are in terms of the volume of total vapors, both the furyl carbinol and ammonia, calculated to STP per volume (apparent) of catalyst per hour.)

The vapors leaving contact with the catalyst are cooled first by means of a water-cooled condenser and then by means of ice and solid carbon dioxide to condense out liquefiable products. The combined condensate thus obtained consists of two layers, one an organic liquid material and the other an aqueous layer. Solid potassium hydroxide is added to the combined condensate to liberate ammonia therefrom and to drive tar bases dissolved in the aqueous layer into the organic layer. The organic layer is then separated, dried over solid KOH and fractionally distilled. The fraction distilling at 90° to 120° C. is separately recovered and its pyridine content determined.

In carrying out the process of this example in the manner described, tetrahydrofurfuryl alcohol was converted into pyridine with a 45 mol percent yield based on the tetrahydrofurfuryl alcohol introduced into contact with the catalyst. Under similar conditions, passing a mixture of tetrahydrofurfuryl alcohol and ammonia in contact with activated alumina alone, the yield of pyridine was only 13.2 mol percent of the tetrahydrofurfuryl alcohol introduced into contact with the catalyst.

*Example 2.*—A catalyst is prepared by mixing dry commercial molybdic acid ($MoO_3$) with commercial activated alumina in proportions corresponding to about 10 parts $MoO_2$ for every 100 parts of the activated alumina. Both the molybdic acid and activated alumina are in the form of powders. Graphite as a lubricant and starch as a binder are incorporated in the mixture and the mixture pelleted under pressure to form pellets of a diameter of about $\frac{5}{32}$ inch. The resulting pellets are heated in air at 450°–500° C. to remove the graphite and starch and then heated for several hours in hydrogen to reduce the molybdenum oxide.

A mixture of vapors of tetrahydrofurfuryl alcohol and ammonia in the proportions of 115 volumes of the alcohol to 348 volumes of the ammonia (calculated to STP) contacted with this catalyst at 489° C. and a space velocity of 463 gave a 40.2 mol percent yield of pyridine.

*Example 3.*—Ammonium molybdate dissolved in 15% aqueous ammonia is mixed with 8-12 mesh commercial activated alumina granules in proportions corresponding to 20 parts by weight of $MoO_2$ for every 100 parts by weight of the alumina. The mixture is then placed in a rotating flask in which it is tumbled while being gently heated under a reduced pressure to thoroughly and uniformly coat the ammonium molybdate on the granules of activated alumina and dry the material. The granules coated with ammonium molybdate are further dried by heating at about 140° C. and then reduced at 450°–500° C. in hydrogen.

Vapors of tetrahydrofurfuryl alcohol mixed with ammonia in the proportions of about 113 volumes of tetrahydrofurfuryl alcohol to every 370 volumes of ammonia (calculated to STP) passed at 496° C. and a space velocity of about 483 in contact with the catalyst prepared in the foregoing manner gave about 46 mol percent yield of pyridine.

*Example 4.*—A catalyst is prepared by the procedure described in Example 1 above, employing ammonium molybdate and activated alumina in proportions corresponding to about 15 parts by weight $MoO_2$ to 100 parts by weight of aluminum oxide.

A mixture of about 74 volumes tetrahydrofurfuryl alcohol for every 311 volumes of ammonia (calculated to STP) contacted with this catalyst at a space velocity of 385 under a reduced pressure of about 96 mm. Hg gave a 49.5 mol percent yield of pyridine.

*Example 5.*—A mixture of pelleted bauxite and molybdenum oxide prepared by the method described in Example 2 above, employing the ammonium molybdate in the proportions corresponding to about 15 parts $MoO_2$ for every 100 parts bauxite, gave a 38 mol percent yield of pyridine from tetrahydrofurfuryl alcohol and ammonia at about 500° C. and 450 space velocity.

A catalyst of activated bauxite coated with about 4 parts by weight of $MoO_2$ for every 100 parts by weight of the bauxite, gave a 35.8 mol percent yield of pyridine.

*Example 6.*—A catalyst prepared by the procedure of Example 3 above, modified to convert the molybenum oxide into the sulfide by heating the catalyst at 450°–500° C. for about 16 hours in an atmosphere of gaseous $H_2S$, gave a 41 mol percent yield of pyridine from tetrahydrofurfuryl alcohol and ammonia at about 500° C. and a space velocity of 472. In preparing this catalyst the ammonium molybdate and activated alumina were used in proportions corresponding to 10 parts by weight molybdenum sulfide (after conversion of the oxide to the sulfide) for every 100 parts by weight of the alumina.

The catalysts may be prepared containing the oxide or sulfide of molybdenum and the alcohol dehydration catalyst deposited on or mixed with an inert support. For example, a catalyst containing 5 parts by weight molybdenum oxide and 5 parts by weight alumina with about 100 parts by weight "Celite" (a diatomaceous earth) is active in promoting the reaction of a hydrofuryl carbinol and ammonia or primary amine.

Methyl tetrahydrofurfuryl carbinol and ethyl tetrahydrofurfuryl carbinol with ammonia in contact with a molybdenum oxide-activated alumina catalyst at 500° C. gave about 50–55 mol percent yield of the corresponding alpha- and beta-substituted pyridines, with the alpha-substituted pyridine constituting the major portion of the product in each case. 5-methyl tetrahydrofurfuryl alcohol gave about 35–40 mol percent yield of alpha-picoline.

We claim:

1. In a catalytic process wherein vapors of a hydrofuryl carbinol in which the carbon atom of the furan ring combined with the carbinol radical is also combined with hydrogen, are reacted with a compound from the group consisting of ammonia and the primary amines to substitute nitrogen for the oxygen of the furan ring and expand the ring to the pyridine ring containing 5 carbon atoms and 1 nitrogen atom, the improvement which comprises reacting said materials in the presence of a contact material comprising aluminum oxide and a compound from the group consisting of molybdenum oxide and sulfide.

2. In a catalytic process wherein vapors of a compound from the group consisting of tetrahydrofurfuryl alcohol and its alkyl-substituted compounds are passed together with ammonia in contact with aluminum oxide at temperatures of about 500° C. to catalyze the reactions of said compound and ammonia whereby the oxygen of the furan ring of said compound is substituted by nitrogen of the ammonia and the ring is expanded to the pyridine ring containing 5 carbon atoms and 1 nitrogen atom, that improvement which comprises contacting said compound and ammonia with a catalyst containing said aluminum oxide mixed with a material from the group consisting of the oxides and sulfides of molybdenum, said material promoting the activity of the catalyst for the formation of compounds containing the pyridine ring in their structure.

3. In a catalytic process wherein vapors of a compound from the group consisting of tetrahydrofurfuryl alcohol and its alkyl-substituted compounds reacts with ammonia to substitute nitrogen of the ammonia for the oxygen of the furan ring of said compound and to expand the ring to the pyridine ring containing 5 carbon atoms and 1 nitrogen atom, that improvement which comprises catalyzing the reaction of said compound and ammonia by a contact material containing activated alumina and a material from the group consisting of molybdenum oxide and molybdenum sulfide.

4. In a process for catalytically reacting ammonia with vapors of a compound from the group consisting of tetrahydrofurfuryl alcohol and its alkyl-substituted compounds to form a compound from the group consisting of pyridine and its alkyl-substituted compounds, that improvement which comprises passing a mixture of vapors said compound and ammonia in contact with a catalyst substantialy consisting of activated alumina and 10 to 30 parts molybdenum oxide for every 100 parts activated alumina at about 500° C.

5. In a process for catalytically reacting ammonia with vapors of a compound from the group consisting of tetrahydrofurfuryl alcohol and its alkyl substituted compounds to substitute nitrogen of the ammonia for the oxygen of the furan ring of said compound and to expand the ring to the pyridine ring containing 5 carbon atoms and 1 nitrogen atom, the improvement which comprises passing a mixture of vapors of said compound and ammonia in contact with a catalyst containing aluminum oxide and about 10 to about 30 parts of a material from the group consisting of molybdenum oxide and molybdenum sulfide for every 100 parts aluminum oxide.

6. In a process wherein vapors of tetrahydrofurfuryl alcohol are passed together with ammonia in contact with aluminum oxide to catalyze the reactions of the tetrahydrofurfuryl alcohol and ammonia to form pyridine, that improvement which comprises contacting the vapors of said tetrahydrofurfuryl alcohol with a catalyst containing said aluminum oxide mixed with 10 to 30 parts by weight of a material from the group consisting of the oxides and sulfides of molybdenum for every 100 parts aluminum oxide, said material promoting the activity of the catalyst for the formation of compounds containing the pyridine ring in their structure.

LEO JEROME SPILLANE.
RALPH COLTON TALLMAN.

REFERENCES CITED

The following references are of record in the file of this patent:

UNITED STATES PATENTS

| Number | Name | Date |
|---|---|---|
| 2,019,883 | Wulff | Nov. 5, 1935 |
| 2,124,566 | Grosse | July 26, 1938 |
| 2,124,567 | Grosse | July 26, 1938 |
| 2,300,971 | Roberts | Nov. 3, 1942 |

FOREIGN PATENTS

| Number | Country | Date |
|---|---|---|
| 573,604 | Germany | 1925 |
| 356,731 | Great Britain | Sept. 1931 |
| 695,472 | Germany | 1940 |

OTHER REFERENCES

Chem. Abstracts, vol. 37, page 6261.
Chem. Abstracts, vol. 39, page 2024.